United States Patent
Josdal

(10) Patent No.: US 9,359,783 B1
(45) Date of Patent: Jun. 7, 2016

(54) AIRCRAFT SHELTER

(71) Applicant: Tyrone Josdal, Bulyea (CA)

(72) Inventor: Tyrone Josdal, Bulyea (CA)

( * ) Notice: Subject to any disclaimer, the term of this patent is extended or adjusted under 35 U.S.C. 154(b) by 0 days.

(21) Appl. No.: 14/844,625

(22) Filed: Sep. 3, 2015

(51) Int. Cl.
  *E04H 6/44* (2006.01)
  *B64F 1/00* (2006.01)
  *E04H 15/18* (2006.01)

(52) U.S. Cl.
  CPC ...... *E04H 6/44* (2013.01); *B64F 1/005* (2013.01); *E04H 15/18* (2013.01)

(58) Field of Classification Search
  CPC ............ E04H 6/44; E04H 15/18; B64F 1/005
  USPC ................................. 52/DIG. 14, 23; 135/117
  See application file for complete search history.

(56) References Cited

U.S. PATENT DOCUMENTS

| | | | |
|---|---|---|---|
| 1,350,289 A | | 8/1920 | Richards |
| 2,778,369 A | | 1/1957 | Tang |
| 2,961,802 A | | 11/1960 | Mongan et al. |
| 3,234,695 A | * | 2/1966 | Johnson ............... E04H 6/44 135/97 |
| 3,261,134 A | | 7/1966 | Crist |
| 3,550,333 A | | 12/1970 | Kliewer et al. |
| 3,823,519 A | | 7/1974 | Cordova |
| 4,228,622 A | * | 10/1980 | Tisma ............... E04H 6/04 52/143 |
| D274,157 S | * | 6/1984 | Freeland ............... D25/56 |
| 4,557,284 A | * | 12/1985 | Bray ............... E04H 15/18 135/115 |
| 4,832,067 A | | 5/1989 | Felber |
| 4,880,024 A | | 11/1989 | Brell |
| 4,959,901 A | | 10/1990 | Parish |
| 4,971,129 A | * | 11/1990 | Townend ............... E06B 3/01 160/193 |
| 5,390,688 A | | 2/1995 | Lipman |
| 6,360,492 B1 | | 3/2002 | Ross |
| 6,749,151 B1 | | 6/2004 | Ross |
| 6,804,917 B2 | * | 10/2004 | Ensign ............... E04H 6/44 244/114 R |
| 7,089,951 B2 | | 8/2006 | Bogart |
| 8,336,807 B2 | | 12/2012 | Hanafin et al. |
| 2001/0052356 A1 | * | 12/2001 | Ross ............... E04H 6/44 135/124 |

FOREIGN PATENT DOCUMENTS

| | | |
|---|---|---|
| CA | 2150677 C | 11/1993 |
| JP | 11293962 A | 10/1999 |

* cited by examiner

Primary Examiner — Robert Canfield
(74) Attorney, Agent, or Firm — Gearhart Law LLC

(57) ABSTRACT

An aircraft shelter comprises a rear shelter section for covering a rear section of an aircraft in a protective manner. A front shelter section extends from the forward edge of the rear shelter section and is movable between a closed position for covering all or at least a substantial portion of the front aircraft section in a protective manner and an open position for enabling entry and exit of the aircraft. The front section cover is made of a flexible fabric material and is supported in the closed position by a front support beam and a front support post. The aircraft shelter will protect various types of aircraft from the elements, occupies a small footprint, and is easily manufactured and installed without the need for significant site preparation work or foundation. The aircraft shelter could optionally be locked in its closed position to reduce risk of theft.

24 Claims, 14 Drawing Sheets

AIRCRAFT SHELTER

CLAIM OF PRIORITY

This application claims priority to a Canadian application entitled "Aircraft Shelter" filed Sep. 3, 2015, having a yet-to-be-assigned serial number.

FIELD OF THE EMBODIMENTS

The field of the present invention and its embodiments relate to an aircraft shelter for protecting an aircraft from adverse weather, and more particularly, to an aircraft shelter that is adaptable for protecting low-wing airplanes, high-wing airplanes, and helicopters. The aircraft shelter can be manufactured for modular or portable assembly and presents significant manufacturing and installation and use advantages over the prior art.

BACKGROUND OF THE EMBODIMENTS

There has long been a need to protect parked small aircraft from adverse weather such as, for example, strong sunlight, strong wind, heavy rain, heavy snow, and hail. Typically, permanent or semi-permanent hangars are used to protect aircraft parked on an airfield. However, hangar space is limited and expensive to rent or purchase. Similar protection scenarios and requirements exist for both high- and low-fixed wing aircraft, as well as helicopters. A variety of semi-permanent shelters have been developed to offer some protection from adverse weather such as disclosed, for example, in U.S. Pat. Nos. 5,390,688 and 7,089,951 for protecting airplanes. Other types of semi-permanent shelters have been specifically developed for protecting helicopters such as disclosed, for example, in U.S. Pat. No. 6,749,151 providing only limited protection and U.S. Pat. No. 8,336,807 providing a complex and expensive clamshell case for encapsulating the helicopter.

Unfortunately, these shelters still have a significant footprint and are most often attached to a fixed or poured concrete footing or the like—therefore, they are viewed by airports as hangars. This type of zoning or characterization makes these shelters more difficult and costly to site, as well as being complicated in cost and labour for installation or manufacture. The need for a fixed footing or foundation also makes the economics of assembling or installing an aircraft shelter cost prohibitive in many smaller locations or environs.

Many of these aircraft shelters are not capable of withstanding strong wind and heavy snow loads as exist in environments such as the North American plains—in these environments it would be desirable to cover and protect the exterior and control surfaces of aircraft parked in an outdoors or semi-protected scenario where full hangar protection is not available, but the need to withstand the elements is a complicating factor in design of such an aircraft shelter. Therefore, a large number of parked light aircraft are simply tied down outside and either completely exposed to adverse weather, or possibly have only some surfaces—canopy, cowling, wings, and/or tail—covered using separate covers made of a fabric material. Unfortunately, the more covers that are used to protect the aircraft, the more time and effort is required for installing and removing them. These partial covers protect from sun but largely do not protect against hail, heavy snow, or wind. In addition to sun protection, it is desirable to provide an aircraft shelter for protecting an aircraft that is capable of withstanding strong wind, heavy rain, heavy snow, and hail.

It would be desirable to provide an aircraft shelter for protecting an aircraft that covers all or a substantial portion of the aircraft and has a substantially small footprint. If it were possible to use a semi-portable or portable aircraft shelter, it is felt that this would be well accepted in the marketplace. Particularly if the need for individual fabric covers were alleviated it is believed this would provide significant benefit.

It is also desirable to provide an aircraft shelter that is easily opened and closed to enable entry/exit of the aircraft. One of the issues with many of the prior art aircraft shelters are that even where they do exist in a reasonably straightforward to erect fashion, the application of multiple covers to the surfaces of the aircraft, often applied during the inclement weather, makes it more difficult and time consuming, and less attractive to use.

SUMMARY OF THE EMBODIMENTS

The object of the present invention is to provide an aircraft shelter for protecting an aircraft which has a substantially small footprint. Another object of the present invention is to provide an aircraft shelter to provide a shelter for protecting an aircraft that is capable of withstanding strong wind, heavy rain, heavy snow, and hail.

Another object of the present invention is to provide an aircraft shelter that is easily opened and closed to enable entry/exit of an aircraft from a defined shelter cavity. The aircraft shelter might also be locked with the aircraft located therein, for the purpose of minimizing the possibility of theft of the stored aircraft.

Another object of the present invention is to provide an aircraft shelter that is adaptable for protecting multiple types of aircraft including low-wing airplanes, high-wing airplanes, and helicopters.

The aircraft shelter includes a rear shelter section defining a rearward shelter cavity, and a front shelter section placed ahead of the forward edge of the rear shelter section and defining a forward shelter cavity. The rear shelter section may include side wall portions engaging the ground, a top defining the apex of the rearward shelter cavity, and/or a forward edge which is positioned in proximity to a forwardmost portion of the rear aircraft section when the aircraft is sheltered therein.

The front shelter section is moveable between a closed position for sheltering the aircraft and an open position for enabling entry and exit of the aircraft from the aircraft shelter. The aircraft shelter might be locked in the closed position, for the purpose of minimizing the possibility of theft of the stored aircraft.

The front shelter section comprises at least one front support beam movably mounted to the forward edge of the rear shelter section in proximity to the top thereof such that in the closed position the at least one front support beam is positioned above the aircraft, and is supported at its at least one distal end by at least one front support post extending downwardly to the ground, and/or a flexible fabric front section cover extending forward from the forward edge of the rear shelter section.

The at least one front support beam may comprise two beams, namely a left front support beam and a right front support beam, and the at least one front support post may include a left front support post connected to the left front support beam and a right front support post connected to the right front support beam. The left front support post may be oriented downward to the ground to the left-hand side of the aircraft and the right front support post may be oriented downward to the ground to the right-hand side of the aircraft.

In the closed position the left front support beam and the right front support beam are substantially rigidly connected to each other. As well, in some embodiments, in the closed position the left front support beam and the right front support beam are disposed in close proximity to each other [permitting them to optionally be locked together]. In some embodiments, each of the left front support beam and the right front support beam are rotatably moveable—in a substantially vertical direction and a substantially horizontal direction, or otherwise. In the closed position the left front support beam and the right front support beam may be positioned above the front aircraft section of the aircraft.

At least one of the left front support beam and the right front support beam can have at least one curved section adapted for surrounding a portion of the aircraft with the aircraft shelter in the closed position (where the aircraft is a helicopter).

A front section cover, made of flexible and element-proof fabric, is mounted to the left front support beam and the right front support beam, and/or the left front support post and the right front support post. In some cases the front section cover comprises a left front section cover and a right front section cover.

In cases where the aircraft to be sheltered is a fixed wing aircraft having a left wing and a right wing, the forwardmost portion of the rear aircraft section may include a horizontal beam extending rearward of the trailing edge of the left wing and another rearward of the right wing of the aircraft. Such an aircraft shelter may further include a left wing shelter section and a right wing shelter section extending outwards and forwards from the forward edge of the rear shelter section and the front shelter section, for sheltering the left wing and the right wing of the aircraft when the aircraft shelter is in the closed position. The left wing shelter section and the right wing shelter section may include a left wing cover and a right wing cover each made of flexible fabric, for covering the left wing and the right wing of the aircraft.

The left wing shelter section may further include a rearward left wing beam laterally extending substantially perpendicularly outwards from the forward edge of the rear shelter section, for supporting the left wing cover. Similarly, a right wing shelter section may further include a rearward right wing beam laterally extending substantially perpendicular outwards from the forward edge of the rear shelter section, for supporting the right wing cover. The rearward left wing beam and the rearward right wing beam will be positioned above the ground approximately equal or higher in height than the forwardmost portion of the rear aircraft section, being behind the trailing edges of the left wing and the right wing. The rearward left wing beam and the rearward right wing beam can be adjustable in length—telescopically for example, and adjustable in height of attachment to the remainder of the aircraft shelter.

The left wing shelter section and the right wing shelter section might each include a forward left wing beam and a forward right wing beam, respectively, to further enhance support for the left wing cover and the right wing cover in front of the leading edge of the left wing and right wing of the aircraft. The forward left wing beam and the forward right wing beam are positioned above the left wing and the right wing of the aircraft and in proximity thereto.

In some embodiments, the aircraft shelter may further include a left cantilever beam mounted to the rear shelter section and extending forward therefrom to support an inner end of the forward left wing beam and/or a right cantilever beam mounted to the rear shelter section and extending forward therefrom to support an inner end of the forward right wing beam. The left cantilever beam and the right cantilever beam may be mounted to the rear shelter section at matching or different distances above the ground.

Some embodiments of the aircraft shelter of the present invention may also include a left wing beam support structure for supporting an outer end of the forward left wing beam and the rearward left wing beam, and a right wing beam support structure for supporting an outer end of the forward right wing beam and the rearward right wing beam. The medial portion of the left wing beam support structure may include a left front support post extending downwardly to the ground, and rotatably moveable mounted to an inner end of the forward left wing beam. Similarly the medial portion of right wing beam support structure may include a right front support post extending downwardly to the ground, and rotatable moveable mounted to an inner end of the forward right wing beam.

Various components of the aircraft shelter are mounted to the ground—various types of ground anchors and mounting will be understood by those skilled in the art and are all contemplated within the scope of the present invention.

In addition to embodiments of the aircraft shelter designed to protect an aircraft which is a fixed wing aircraft, other embodiments of the aircraft shelter could be designed for the protection of an aircraft which was a helicopter—necessary changes to the front support beam and frame structure to accommodate the upper rotor shaft and lack of wings on such an aircraft will be understood to those skilled in the art and as outlined the aircraft shelter designed for the protection of either a fixed wing airplane or a helicopter are all contemplated within the scope of the present invention.

The aircraft shelter protects an aircraft from the elements, is easily and cost effectively manufactured and installed, and is easily opened and closed to enable entry/exit of the aircraft.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The present invention is an aircraft shelter for use in the storage and shelter of an aircraft. The aircraft shelter is easily assembled, with little requirements in terms of foundation or ground work on site, and allows for reasonably quick protection to be applied over an aircraft to protect it from the elements. The aircraft can be reasonably quickly placed into and out of the aircraft shelter, and the aircraft shelter provides enhanced protection for the aircraft and has structural integrity in inclement conditions including wind, rain and snow loads. The aircraft shelter can also optionally be locked closed, to allow for theft protection of the aircraft stored therein. The embodiments of the invention described herein are intended for protecting small aircraft such as, for example, aircraft that are considered "light aircraft" in the aviation industry. This being said, however, while the embodiments of the invention outlined herein demonstrate protection and shelter of single engine propeller driven aircraft, it will be evident to those skilled in the art that the embodiments of the invention are not limited thereto, but are also adaptable for protecting small twin engine propeller driven airplanes, small jet airplanes and glider airplanes.

Figure 1:
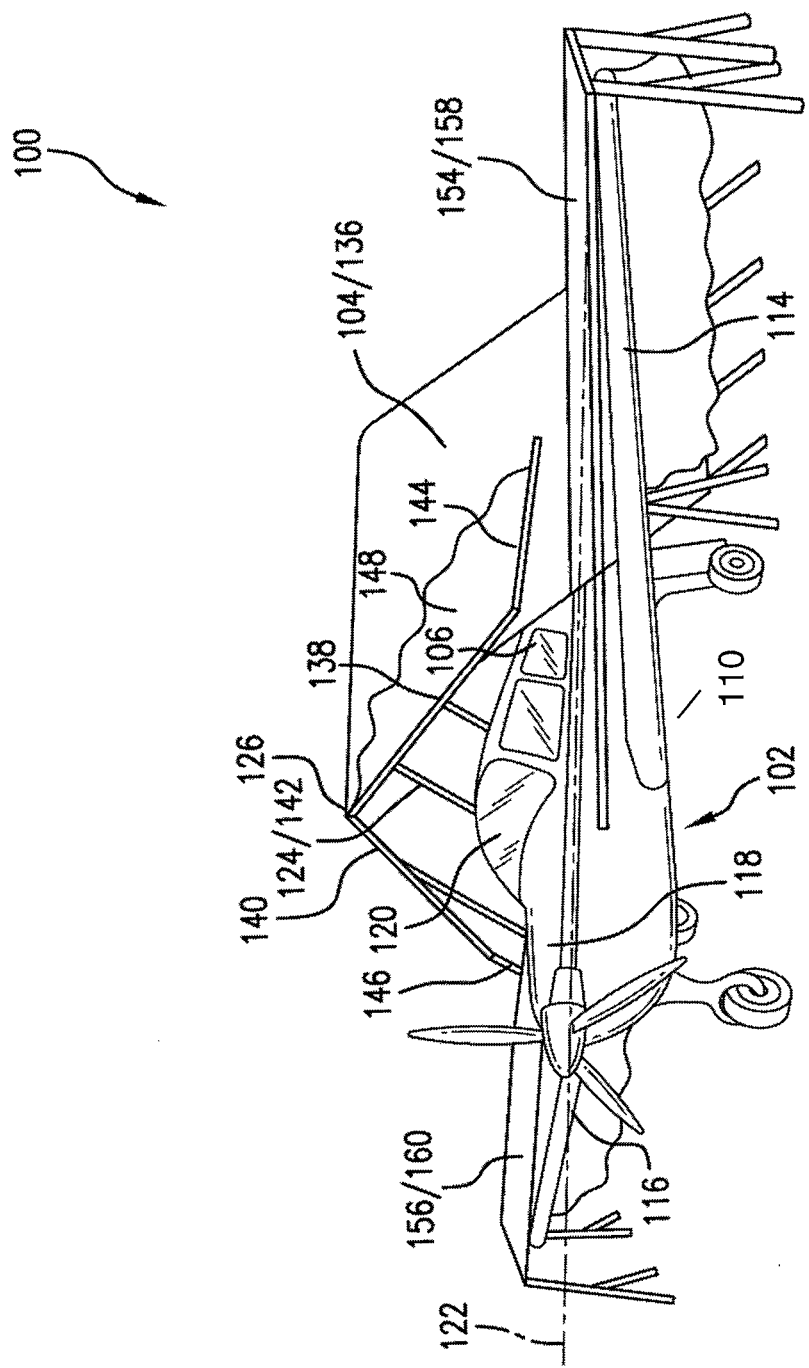
FIG. 1 is a perspective front view of one embodiment of an aircraft shelter for an aircraft which is a low-wing airplane, and shows the aircraft shelter being in an open position.
Figure 2:
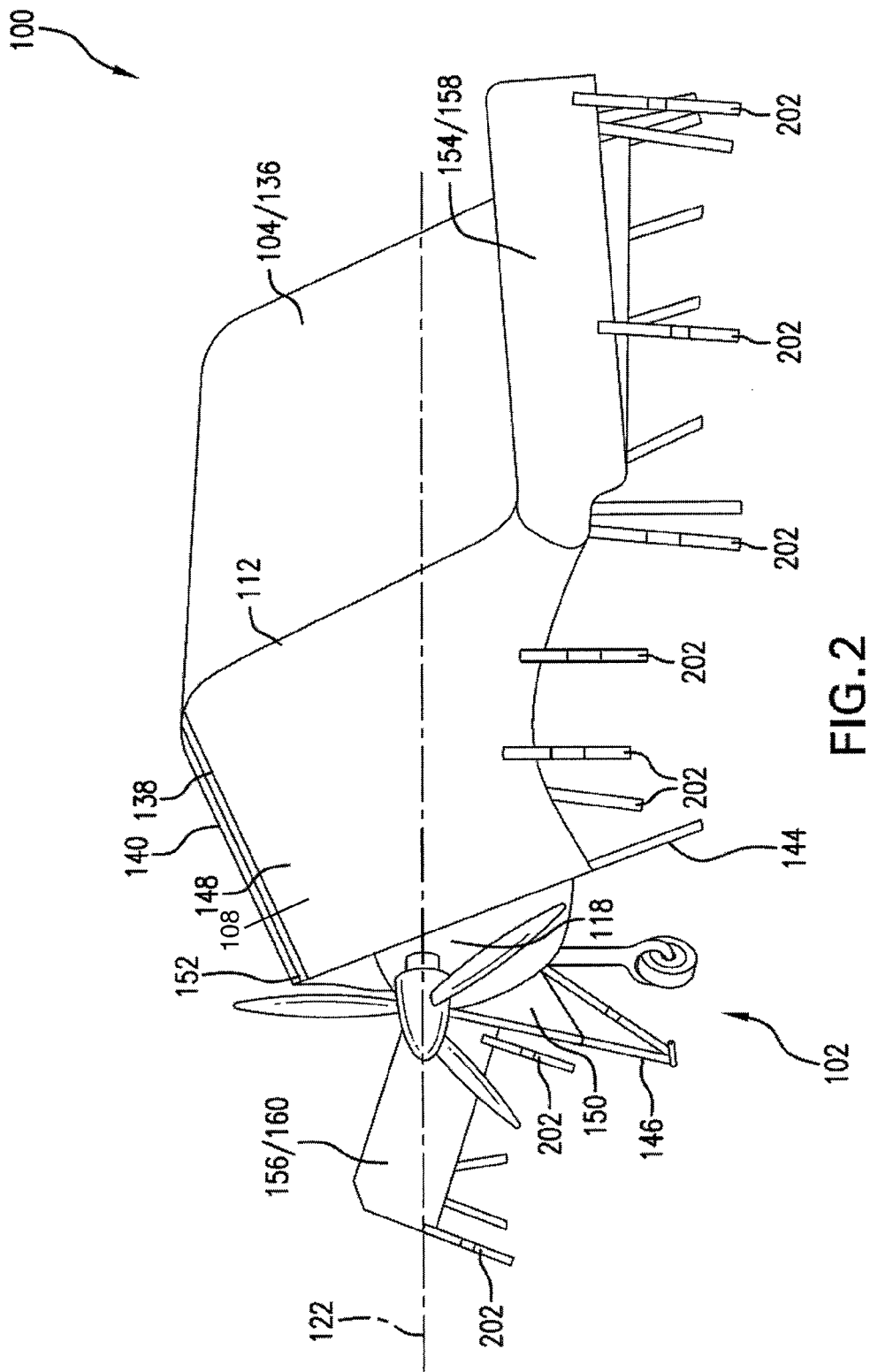
FIG. 2 is a perspective front view of the aircraft shelter of FIG. 1, in a closed position.

Referring first to FIG. 1 and FIG. 2, there is shown an aircraft shelter 100 which is intended for use in the shelter of an aircraft 102. FIG. 1 shows the aircraft shelter 100 in an open position, and FIG. 2 shows the aircraft shelter 100 in a closed position, sheltering the aircraft 102. In this case the aircraft 102 which is shown is a low-wing airplane. The aircraft 102 as shown has a left wing 114 and a right wing 116. For the purpose of describing the operation of the invention, the two sections of the aircraft 102 which are described are the rear aircraft section and the front aircraft section. The rear aircraft section 106, as outlined in further detail herein, in the case of a fixed wing airplane, is the section of the airplane behind the trailing edge of the wings, and the front aircraft section 110 is the section of the airplane including the wings and the fuselage ahead of the wings to the front of the airplane—for example the cowling 118 and canopy 120 sections of the aircraft 102 as shown.

The aircraft shelter 100 includes a rear shelter section 104 for covering a rear aircraft section 106 in a protective manner, such that the front end of the rear shelter section 104 is placed behind and in proximity to the trailing edge of the left wing 114 and the right wing 116. A front shelter section 108 extends forward from the forward edge 112 of the rear shelter section 104 and is moveable between a closed position for covering at least a substantial portion of the front aircraft section in a protective manner, and an open position for enabling entry and exit of the aircraft 102.

The rear shelter section 104 has a forward edge 112 which would be positioned behind and in proximity to the trailing edges of the left wing 114 and the right wing 116 of the aircraft 102. The front shelter section 108 extends forward from the forward edge 112 of the rear shelter section 104. The front shelter section 108 is moveable between an open position and a closed position—in the closed position, the front shelter section 108 will shelter a substantial portion of a front aircraft section 110—for example the cowling 118 and the canopy 120—and when in the open position, the aircraft 102 can be moved into or out of the aircraft shelter 100.

Figure 5:
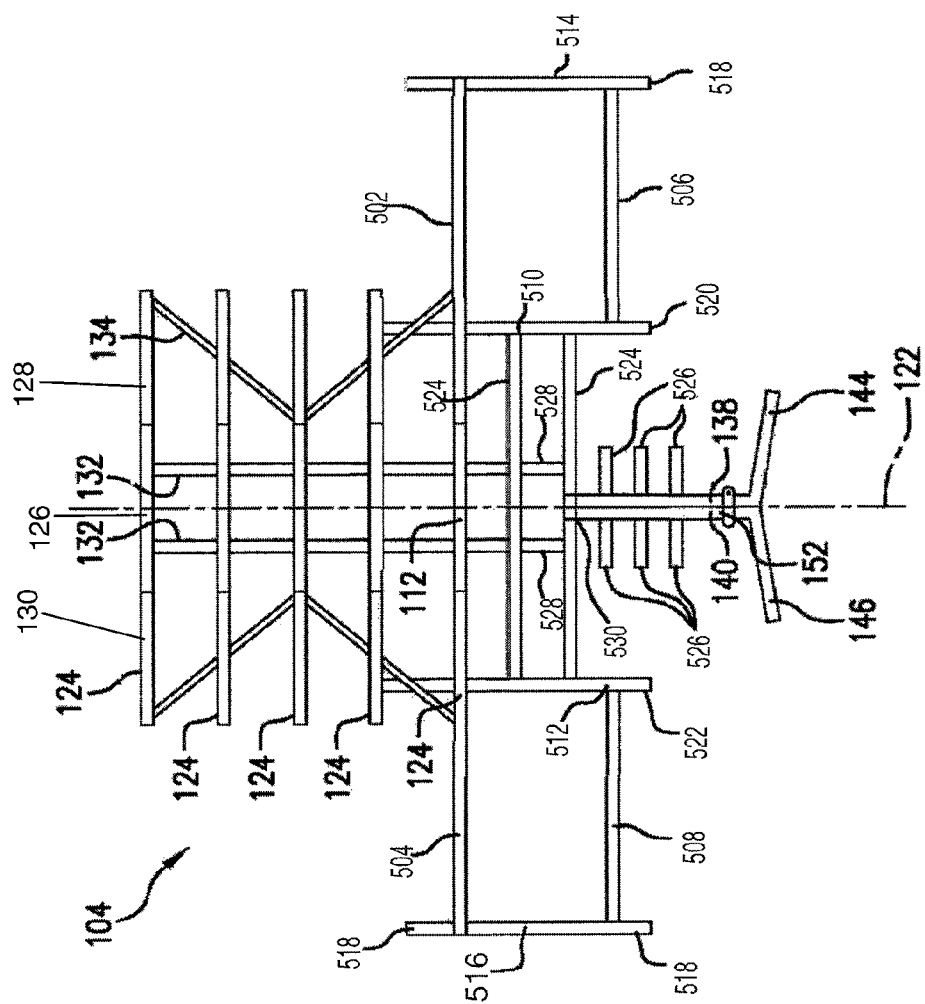
FIG. 5 is a detailed schematic view of the frame of one embodiment of an aircraft shelter in accordance with the invention, in closed position.

The rear shelter section 104 as shown includes a rear section support frame 142 which is comprised of a plurality of rear shelter section members 124 positioned parallel to each other and approximately perpendicular to axis 122. In this FIG. 1 embodiment, the number of arch-type rear shelter section members 124 is four. It will be understood that the number, size and shape of the rear shelter section members 124 could vary, based for example on the shape and size of the aircraft 102 that it was desired to protect. As shown, the rear shelter section members 124 are connected via longitudinal braces 132 and diagonal braces 134 made of, for example, round, square or rectangular tubing material, in a conventional manner using standard tubing couplers or clamps. The number and type of longitudinal braces 132 and diagonal braces 134 used, as well as their shape, construction or other parameters could all be varied without departing from the scope and intention herein. In many embodiments considered, each of the rear shelter section members 124 would be made up of a top segment 126, left wall segment 128 and right wall segment 130 which were disconnectible from each other, using standard tubing couplers, to facilitate transport and handling (these sections of the members 124 are seen in FIG. 5). Preferably, the rear shelter section 104 is such that the defined rearward shelter cavity surrounds the rear aircraft section 106 in close proximity thereto to ensure a small footprint while enabling easy entry and exit of the rear aircraft section 106 by moving the same substantially along the axis 122 using, for example, a pushback tractor.

The rear shelter section members 124 support a rear section cover 136 made of, for example, a flexible fabric material which is secured in a conventional manner using straps, buckles, and cinch straps fastened thereto or to conventional ground anchors. Alternatively, the rear shelter section 104 could also be constructed as a rigid shell structure made of, for example, a plurality of wall and roof sections. In the case of a rigid rear section cover 136 defining the rearward shelter cavity, the rear section cover 136 might comprise a series of self-supporting cover sections, or might alternatively comprise rigid cover sections on a rear section support frame. Either flexible or rigid construction of the rear section cover 136 is contemplated within the scope hereof.

Each of the rear shelter section members 124 is secured to a ground anchor, such as, for example, a conventional auger/helix ground anchor, using, for example, a standard clevis and clevis pin coupler. Many methods and apparatus for the removable or rapid ground anchoring of components will be understood to those skilled in the art of portable structure design, and all methods of ground attachment of these and other components of the aircraft shelter 100 will be understood to be within the scope of the present invention.

Figure 3:
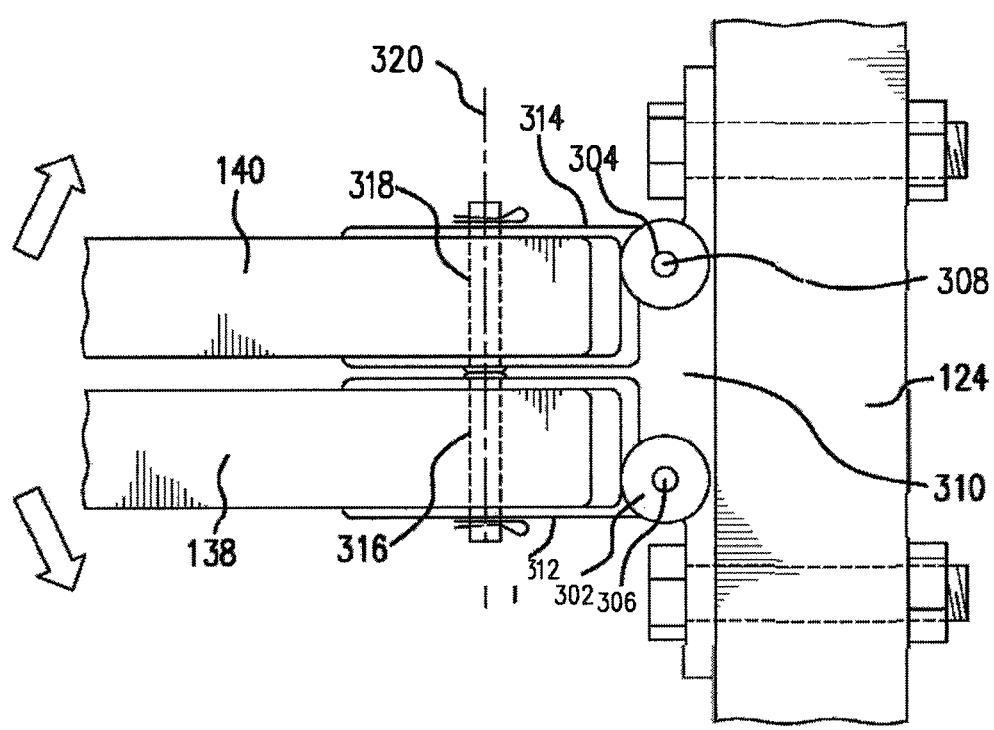
FIG. 3 is a top view of one embodiment of a structure for rotatably mounting the left front support beam and right front support beam to the rear section of the aircraft shelter.
Figure 4:
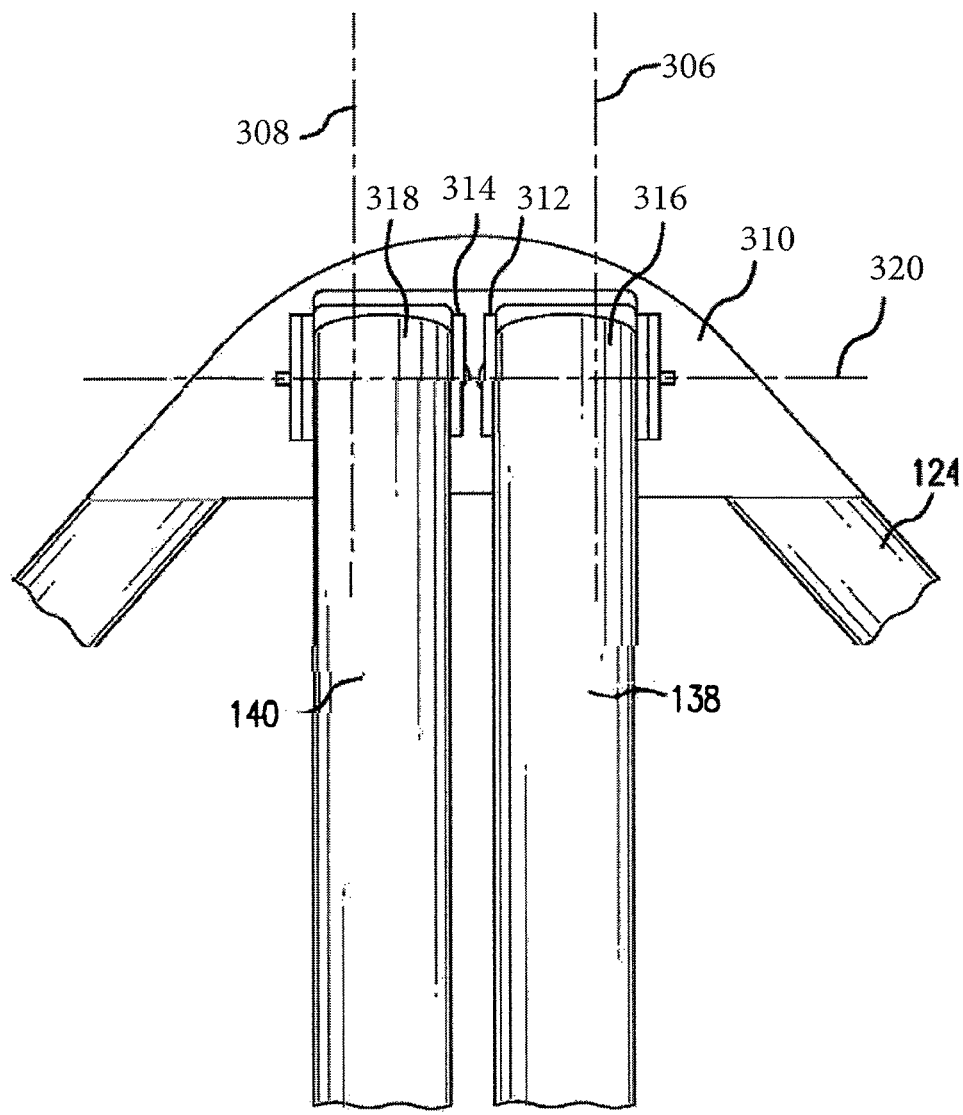
FIG. 4 is a front view of the components of FIG. 3.

A front shelter section 108 comprises a left front support beam 138 and a right front support beam 140, which are moveably mounted to the forward edge 112 of the rear shelter section 104 in proximity to the top segment 126 thereof such that when the aircraft shelter 100 is in the closed position the left front support beam 138 and the right front support beam 140 are disposed above the front aircraft section 110 and extend forward from the forward edge 112 and above the aircraft 102. Preferably, each of the left front support beam 138 and the right front support beam 140 are mounted rotatably to the forward edge 112 of the rear shelter section 104 such that they can each be rotatably moved in either or both of a substantially vertical and a substantially horizontal direction. Referring to FIG. 3 there is shown in detail one mounting of the left front support beam 138 and the right front support beam 140 to the rear shelter section 104—left hinge 302 and right hinge 304 enable rotational movement about the left vertical axis 306 and right vertical axis 308, respectively, and are mounted in close proximity to each other to the forward edge 112 of the rear shelter section 104, typically to the forward most of the rear shelter section members 124, near its apex. A mounting plate 310 is shown which is mounted to the forwardmost of the rear shelter section members 124 using conventional means. The left hinge 302 is attached to the left front support beam 138 via a U-shaped left coupling member 312 and a left clevis pin 316 and a related split or cotter pin, enabling rotational movement around horizontal axis 320. Similarly, the right hinge 304 is attached to the right front support beam 140 via a U-shaped right coupling member 314 and a right clevis pin 318 and a related split or cotter pin, enabling horizontal movement of the right front support beam 140 around horizontal axis 320. The attachment of the left front support beam 138 and the right front support beam 140 to the rear shelter section 104, allowing dual axis rotational movement, could be done with other hardware and in different ways and any such attachment method accomplishing the same goal is contemplated within the scope hereof. Alternatively, the left front support beam 138 and the right front support beam 140 might be removably mounted to the apex of the forward edge 112 of the rear shelter section 104 using, for example, screw bolts or the like. FIG. 4 shows a front view of the component view of FIG. 3.

Figure 10:
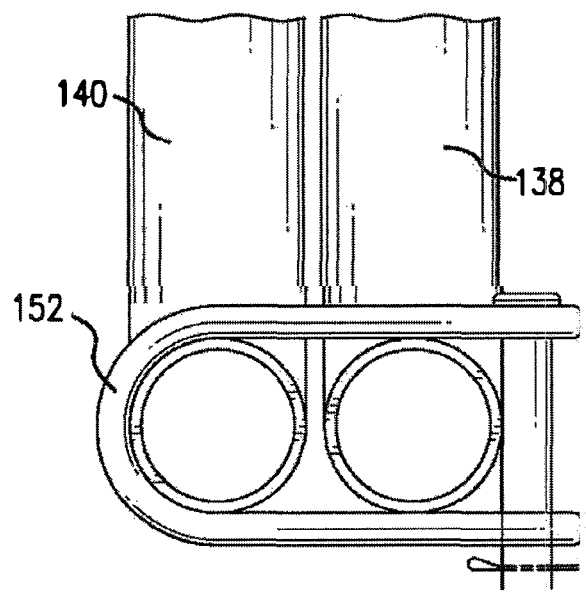
FIG. 10 is a side view of one embodiment of a coupler for rigidly coupling of the left front support beam and the right front support beam.

The rotational movement of each of the left front support beam 138 and the right front support beam 140 around the left vertical axis 306, the right vertical axis 308 and the horizontal axis 320, and the rotational movement between each of the left front support beam 138 and the right front support beam 140 and the left front support post 144 and the right front support post 146, respectively, substantially facilitates the movement of the same upward and rearward over the left wing 114 and the right wing 116 of the aircraft 102, to open the front shelter section 108 and vice versa for moving same to the closed position. Preferably, in the closed position, the left front support beam 138 and the right front support beam 140 are disposed in close proximity to each other and substantially rigidly coupled to each other via a support beam coupler 152. FIG. 10 shows one example of a support beam coupler 152, which is a clevis and pin arrangement, to increase the rigidity and strength of the combined left front support beam 138 and right front support beam 140.

The left front support beam 138 is preferably rotatably and moveably attached at its distal end from the mounting plate 310 to a left front support post 144, and the right front support beam 140 is similarly attached at its distal end from the mounting plate 310 to a right front support post 146. Each of the left front support post 144 and the right front support post 146 extend downwardly to the ground for supporting the same in a conventional manner, using for example, a clevis and pin arrangement as shown. Each of the left front support post 144 and the right front support post 146 is securable to a ground anchor which could again be of many different types.

Optionally, the aircraft shelter 100 might be lockable in the closed position by providing locking hardware to fixedly attach left front support beam 138 and right front support beam 140 to each other.

The left front support beam 138 and the right front support beam 140 together with the left front support post 144 and the right front support post 146 support respectively a left front section cover 148 and a right front section cover 150 made of a flexible fabric material for covering at least a substantial portion of the front aircraft section 110, with the left front section cover 148 and the right front section cover 150 extending forward from the forward edge 112 of the rear shelter section 104.

As shown in FIG. 2, in the closed position the left front support beam 138 and the right front support beam 140 are placed above the front aircraft section 110, with the left front support post 144 being oriented downward and to the left-hand side of the aircraft 102 and the right front support post 146 being oriented downward and to the right-hand side of the aircraft 102. Preferably an upper edge portion of the left front section cover 148 and the right front section cover 150 are mounted to the left front support beam 138 and the right front support beam 140, respectively, and a front edge portion of the left front section cover 148 and the right front section cover 150 are mounted to the left front support post 144 and the right front support post 146, respectively, in conventional manner using, for example, hem pockets disposed in the left front section cover 148 and the right front section cover 150 accommodating the respective portions of the left front support beam 138, left front support post 144, right front support beam 140 and right front support post 146 therein. The left front section cover 148 and the right front section cover 150 are secured in a conventional manner using straps, buckles, and cinch straps 112 fastened to the left front support post 144 and right front support post 146 and/or to conventional ground anchors. Other front support beam configurations could also be used without departing from the scope and intention hereof.

FIG. 5 demonstrates one embodiment of the structural frame of an aircraft shelter 100 in accordance with the invention. There is shown the rear shelter section 104 and the rear shelter section members 124. The front shelter section 108, forward of the forward edge 112 of the rear shelter section 104 is also shown. The front shelter section 108 includes a left wing shelter section 154 and a right wing shelter section 156, as shown in FIGS. 1 and 2, capable of protecting the outboard portions of the left wing and right wing of the aircraft 102, where the aircraft 102 is a fixed wing aircraft. As shown, the left wing shelter section 154 includes a rearward left wing beam 502 laterally extending outward from the forward most of the rear shelter section members 124, at the forward edge 112 of the rear shelter section 104. The rearward left wing beam 502 extends to beyond the wingtip of the left wing 114 of the aircraft 102. Similarly the right wing shelter section 156 includes a rearward right wing beam 504 extending laterally outwards from the right side of the rear shelter section 104, from the forward most of the rear shelter section members 124, at the forward edge 112 of the rear shelter section 104. The rearward right wing beam 504 extends to beyond the wingtip of the right wing 116 of the aircraft 102. The rear shelter section 104 and the rearward right wing beam 504 are mounted to the forward most of the rear shelter section members 124 such that they are disposed above the ground approximately higher or equal to the height of the trailing edge of the left wing 114 and the right wing 116 of the aircraft 102.

The left wing shelter section 154 includes a forward left wing beam 506 located in front of a leading edge of the left wing 114 of the aircraft 102, such that the forward left wing beam 506 is disposed above the left wing 114 and in proximity thereto. Similarly, the right wing shelter section 156 also includes a forward right wing beam 508 located in front of a leading edge of the right wing 116 of the aircraft 102, above the right wing 116 and in proximity thereto.

A left cantilever beam 510 is mounted to the rear shelter section 104 and extends forward therefrom to support an inner end of the forward left wing beam 506. Similarly, a right cantilever beam 512 is mounted to the rear shelter section 104 and extends forward therefrom to support an inner end of the forward right wing beam 508. At the distal ends of the rearward left wing beam 502 and the forward left wing beam 506, a left outer wing beam support 514 holds and supports those beams in relation to each other and strengthens the left wing shelter section 154. Similarly, at the distal ends of the rearward right wing beam 504 and the forward right wing beam 508, a right outer wing beam support 516 holds and supports those beams in relation to each other and strengthens the right wing shelter section 156. A plurality of wing beam support structures 518 extend downwards from the rearward left wing beam 502, the rear aircraft section 106, the forward left wing beam 506 and the forward right wing beam 508 to support the left wing shelter section 154 and the right wing shelter section 156 above the ground. The wing beam support structures 518 are preferably secured to ground anchors. As in the case of other points of the aircraft shelter 100 anchored to the ground, ground anchors of many types could be used.

The framing structure shown in FIG. 5 includes a forward cover support panel, mounted between the left cantilever beam 510 and the right cantilever beam 512 for the purpose of providing support to the left front section cover 148 and the right front section cover 150 when closed over the aircraft 102. This panel could further strengthen the front shelter section 108 and provide additional support for the left front section cover 148 and the right front section cover 150, by supporting that fabric on top of the forward section support member 524. The forward cover support panel includes at least one forward section support member 524, and two frame member 528 are shown. This forward cover support panel is intended to reduce the distance that the left front section cover 148 and right front section cover 150 are cantilevered over the front aircraft section 110, by shortening the left front support beam 138 and the right front support beam 140 and moving their point of attachment forward from the forward edge 112 of the rear shelter section 104 to the forward panel hinge point 530. The forward cover support panel could be constructed or integrated into the front shelter section 108 in many different specific formats, all of which are intended within the scope of the present invention insofar as they accomplish the objective of providing support for the left front section cover 148 and the right front section cover 150 forward of the forward edge 112 of the rear shelter section 104, and/or decreasing the distance that the cantilever of the front shelter section 108 extends over the aircraft 102.

Also shown are a plurality of forward partial support member 526 elements, extending outwardly from the left front support beam 138 and the right front support beam 140 to provide further support to the left front section cover 148 and the right front section cover 150, to keep them off or supported over the upper area of the front aircraft section 110. In this case six forward partial support member 526 elements are shown.

Also shown is a left wing beam support post 520 supporting an inner end portion of the forward left wing beam 506, extending downwardly therefrom to the ground and anchored to the ground, and a right wing beam support post 522 supporting an inner end portion of the forward right wing beam 508 extending downwardly to the ground and anchored to the ground. Preferably the left wing beam support post 520 and the right wing beam support post 522 are rotatably mounted to their respective forward wing beams, allowing rotation of same in an upward direction to enable entry and exit of the left wing 114 and the right wing 116 of the aircraft 102 into and from the left wing shelter section 154 and the right wing shelter section 156 respectively. Optionally the left wing beam support post 520 and the right wing beam support post 522 are removably mounted using, for example, screw bolts or pins.

The left cantilever beam 510 and the right cantilever beam 512 could be adapted to withstand weather and wind and snow loads acting on the respective left wing shelter section 154 and the right wing shelter section 156, allowing for omission of the left wing beam support post 520 and the right wing beam support post 522.

Figure 6:
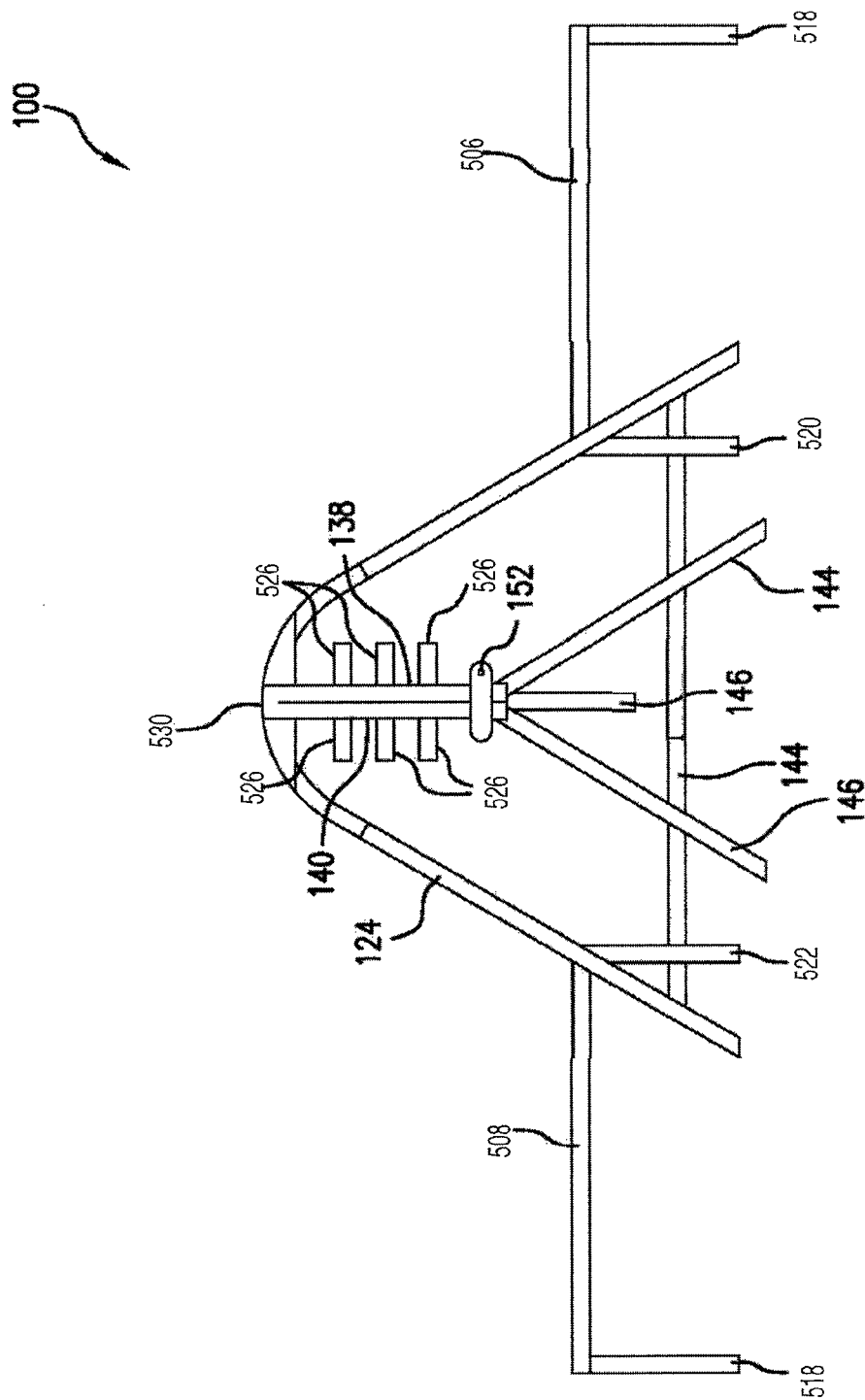
FIG. 6 is a front view of the frame of the aircraft shelter of FIG. 5.
Figure 7:
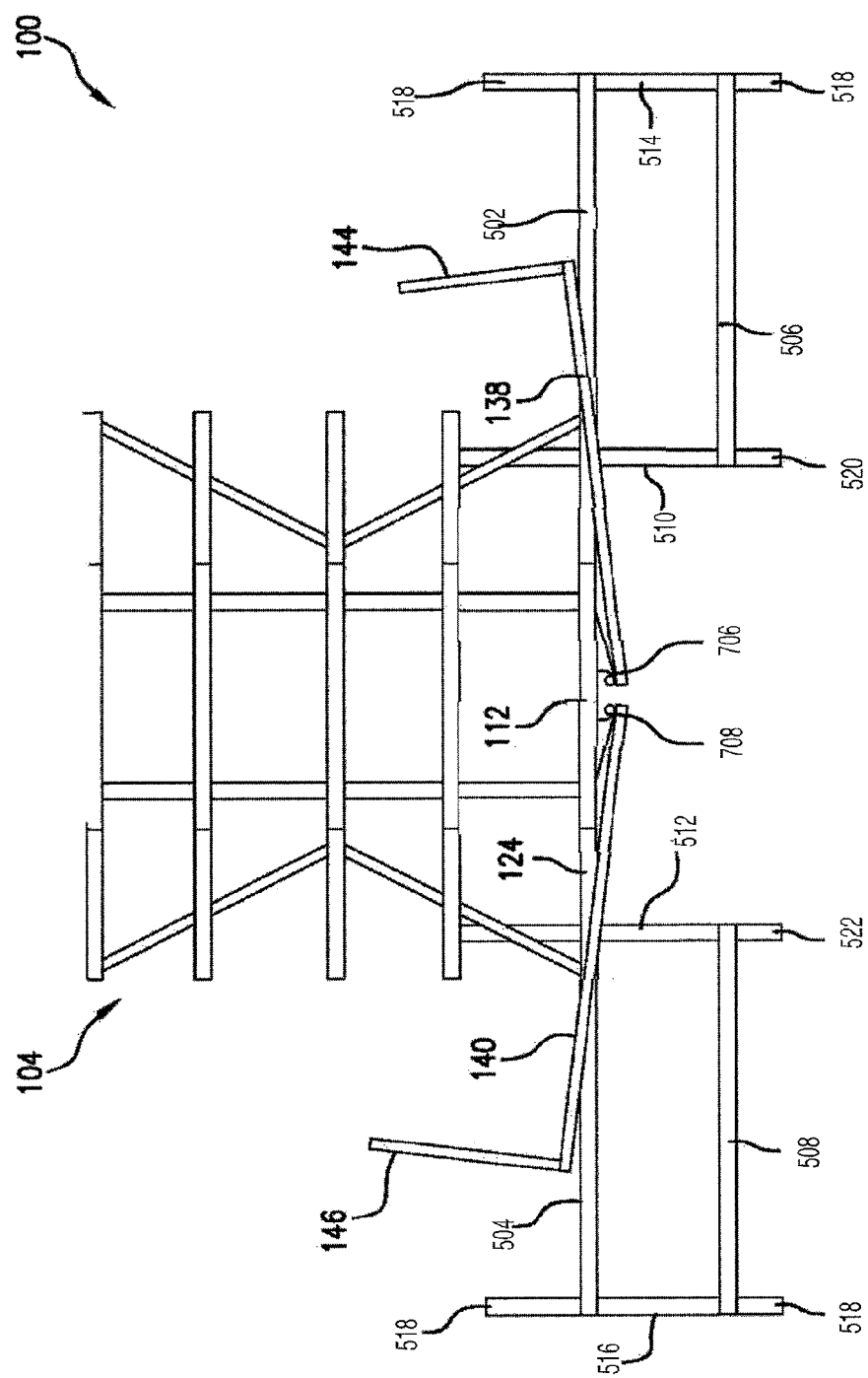
FIG. 7 is a detailed schematic view of an alternate embodiment of the frame of an aircraft shelter in accordance with the invention in open position.

FIG. 6 shows a front view of the frame structure of FIG. 5, in a closed position. While it is conceived that many embodiments of the aircraft shelter 100 would include the forward cover support panel and the plurality of forward partial support member 526 elements detailed in FIG. 5 and FIG. 6, FIG. 7 demonstrates another embodiment of the frame structure of the aircraft shelter 100 of the present invention, without the forward cover support panel. This frame is shown in open position.

Shown next in the embodiment of FIG. 1 et al. are a left wing shelter section 154 and a right wing shelter section 156 each of which extends substantially laterally from near the forward edge 112 of the rear shelter section 104, and the front shelter section 108, for covering the left wing 114 and right wing 116 of the aircraft 102, respectively. The left wing shelter section 154 comprises a flexible fabric left wing cover 158 to cover the left wing 114 of the aircraft 102 and the right wing shelter section 156 comprises a flexible fabric right wing cover 160 to cover the right wing 116 of the aircraft 102. Each of the left wing cover 158 and the right wing cover 160 is preferably supported by a frame structure such that the fabric wing covers do not touch the wings of the aircraft 102.

Figure 8:
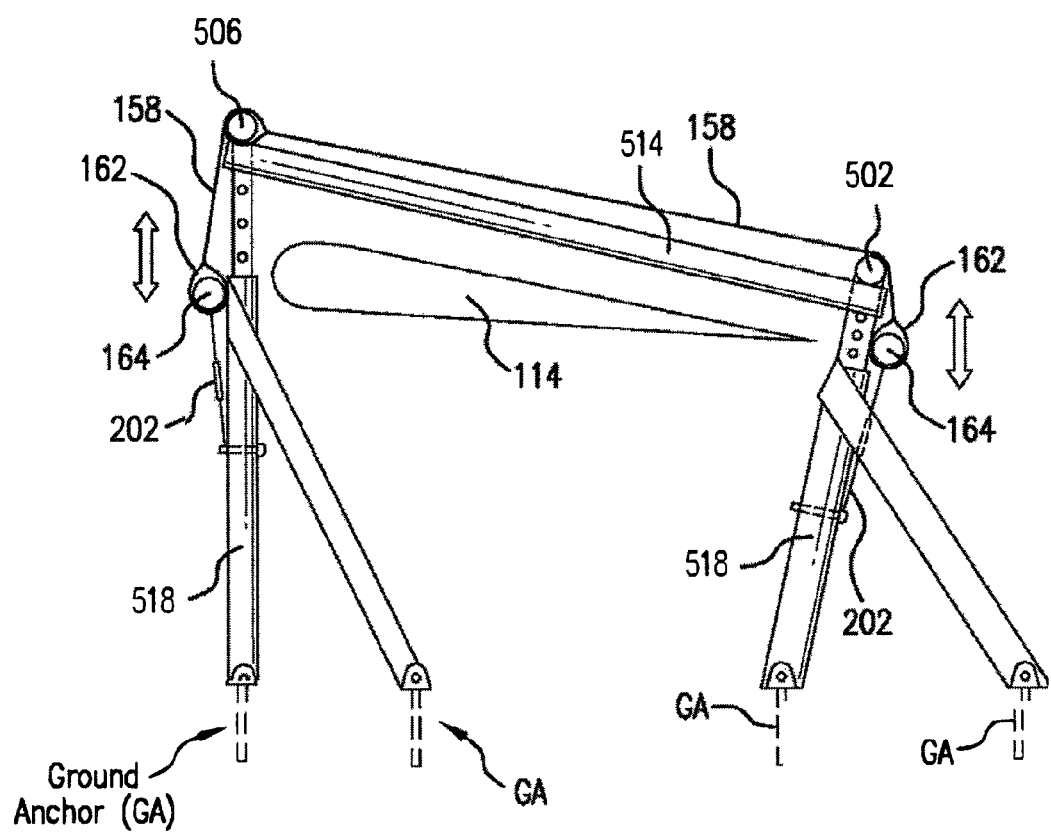
FIG. 8 is a cutaway side view of one embodiment of a left wing beam outer support structure in accordance with the present invention.

FIG. 8 shows a cutaway side view of a left wing shelter section 154 in accordance with an embodiment of the invention, demonstrating the positioning and interaction of various components of the left wing shelter section 154 with the left wing 114 of the aircraft 102 in position therein. Preferably the wing beam support structures 518, left outer wing beam support 514 and the left wing beam support post 520 are telescopically adjustable in a substantially vertical direction as directed by the block arrows in FIG. 8, thus enabling the left wing shelter section 154 and the right wing shelter section 156 to be adjusted for different aircraft 102 such as low wing or high wing airplanes. Optionally, the rearward left wing beam 502 and forward left wing beam 506 could also be telescopically adjustable to accommodate aircraft 102 having different wing spans. Alternatively, the left wing shelter section 154 could comprise only the rearward left wing beam 502 with the left wing cover 158—secured to ground anchors in front of the left wing 114 with the aircraft 102 in place therein, the left wing cover 158 being in contact with a top portion and leading edge of the wing in such embodiments. The embodiment of FIG. 8 shows a cutaway view of an outboard left wing shelter section 154. The right wing shelter section on the other side of the aircraft could be manufactured in a reflective fashion such that the configuration of that section of the aircraft shelter was reflective in form and function except that the right wing shelter section extends outwardly approximately perpendicular to the right of the aircraft fuselage, versus to the left.

Figure 9:
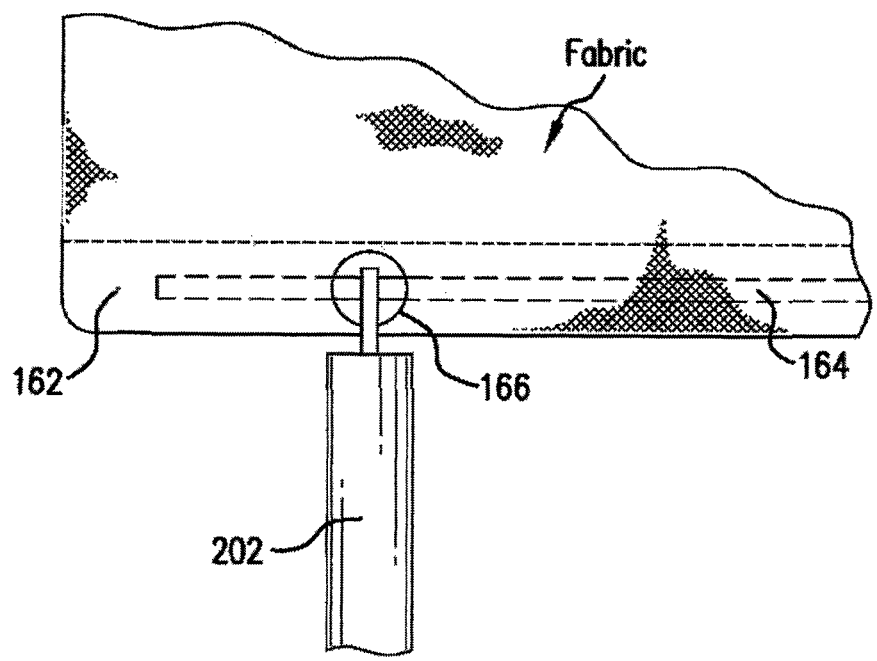
FIG. 9 is a detail view of one embodiment of a hem pocket attachment of a fabric cover to a longitudinal element.

Preferably, the covers for the rear shelter section 104, the front shelter section 108, the left wing cover 158 and right wing cover 160 are provided as separate covers secured to the respective frame structures via hem pockets and/or cinch straps for interacting with grommets disposed in the covers for tightening the same in a manner known to one skilled in the art. FIG. 9 is a detail view of a hem pocket configuration of a flexible fabric cover, for example the left wing cover 158 or the right wing cover 160—hem pocket 162 is disposed along the lower edge of a cover, accommodating longitudinal member 164 therein. Cutaway 166 are disposed at predetermined locations allowing straps or cinch straps 202 to interact with the longitudinal member 164 for securing the various flexible fabric covers such as the left wing cover 158 and right wing cover 160 to ground anchors or support members.

The front and rear edges of the left wing cover 158 and right wing cover 160 each comprise a hem pocket 162 accommodating a longitudinal member 164 therein, as shown in FIG. 9. Adjustable cinch straps 202 interacting with the longitudinal member 164 are attached to maintain tension on the left wing cover 158 and right wing cover 160.

Optionally each of the left wing cover 158 and right wing cover 160 further comprise a hem pocket for accommodating the forward left wing beam 506 and forward right wing beam 508 respectively, thus allowing a front portion of each of the left wing cover 158 and right wing cover 160 to be released and folded on top of the left wing cover 158 and right wing cover 160, allowing entry and exit of the left wing 114 and right wing 116 into and from the respective left wing shelter section 154 and right wing shelter section 156 while the remaining portion of each flexible wing cover remains secured in place. Alternatively the cinch straps 202 are secured to respective ground anchors.

Preferably, adjacent covers have sufficient overlap to ensure protection of the airplane and are, for example, secured to each other using snap fasteners or hook and loop fasteners. The flexible fabric material is, preferably, chosen from a large variety of commercially available materials known in the art as 'Marine Canvas' materials such as, for example, acrylics, PVC coated polyester vinyls, silicon treated substrates and coated meshes for outdoor use. Most marine canvas materials offer UV and UVB resistance, substantial strength, and, to some extent, water resistance or waterproofness.

The left wing cover 158 and right wing cover 160 might optionally include cutouts to accommodate, for example, the engine cowling of a twin engine aircraft 102. Alternatively, the high wing configuration of the design will accommodate twin engine aircraft. Preferably the rear section cover 136, the left front section cover 148 and right front section cover 150, and the left wing cover 158 and right wing cover 160 are provided as separate covers secured to the respective sections of the frame of the aircraft shelter 100 via hem pockets and/or cinch straps 202 for interacting with grommets disposed in the covers for tightening same in a manner known to those skilled in the art. Preferably adjacent covers have sufficient overlap to ensure protection of the aircraft 102 and are, for example, secured to each other using snap fasteners, hook and loop fasteners or the like.

To open the aircraft shelter 100 in the embodiments shown, the cinch straps 202 securing the left front section cover 148, right front section cover 150 and the left wing cover 158 and right wing cover 160 are released. The front sections of each of the left wing cover 158 and right wing cover 160 are then folded up on top of the respective left wing cover 158 and right wing cover 160. The left wing beam support post 520 and the right wing beam support post 522 are then rotated upwards and secured in the upper position. The support beam coupler 152 is then opened to release the left front support beam 138 and the right front support beam 140, while the left front support post 144 and the right front support post 146 are released from their ground anchors. Finally the left front support beam 138 and the right front support beam 140, and the associated left front section cover 148 and right front section cover 150 and left front support beam 138 and right front support beam 140 are moved upwardly and rearwardly such that the left front support post 144 and right front support post 146 are moved over and placed to the rear of the respective left wing shelter section 154 and right wing shelter section 156. To close the aircraft shelter 100, the inverse of these steps is performed in reverse order to close, fasten and cinch the covers into place.

Figure 11:
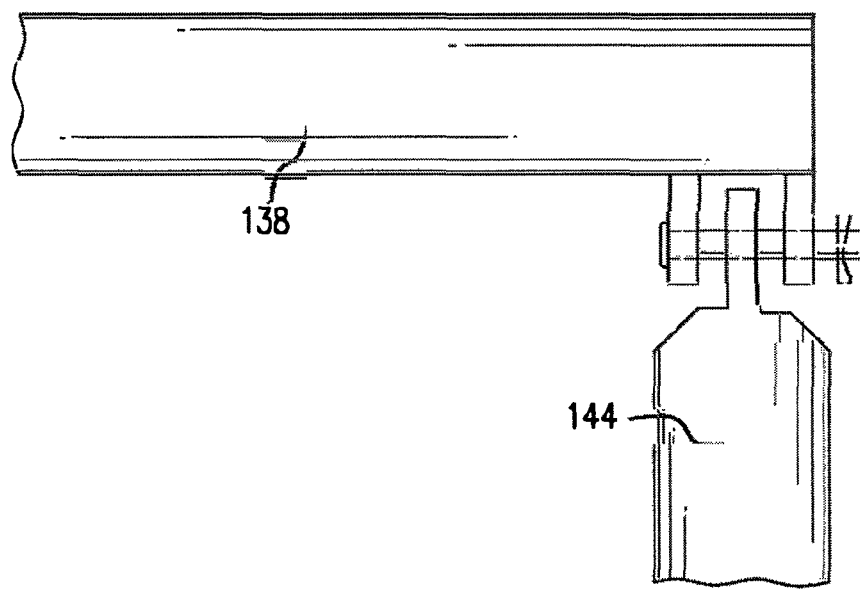
FIG. 11 is a side view of one embodiment of a coupler for coupling each of the left front support beam and the right front support beam to the left front support post and right front support post, respectively.

FIG. 10 and FIG. 11 provide detail views of further specific components of the aircraft shelter 100 of FIG. 1.

Figure 12:
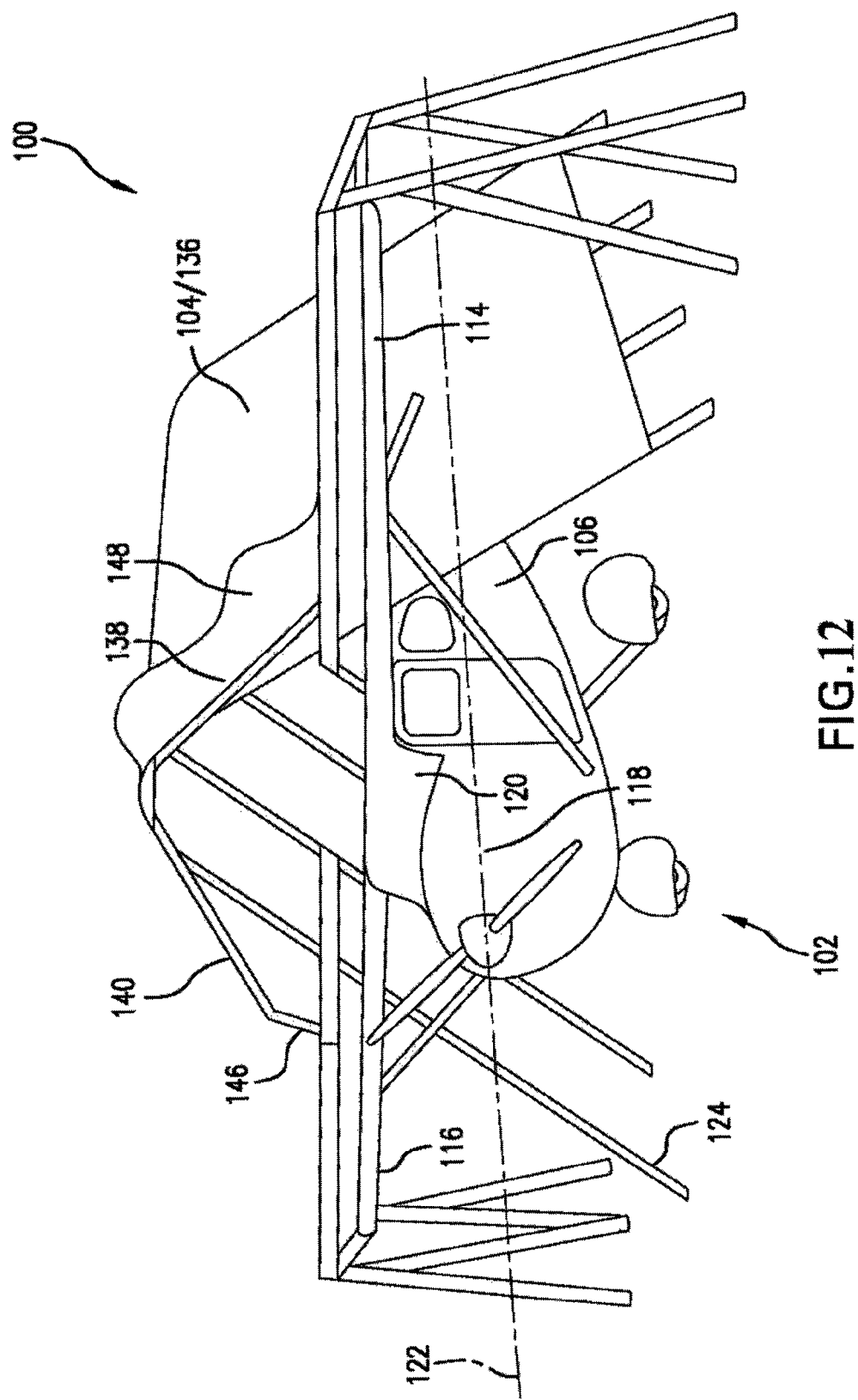
FIG. 12 is a perspective front view of another embodiment of the aircraft shelter, where the aircraft is a high-wing, the aircraft shelter being in an open position.
Figure 13:
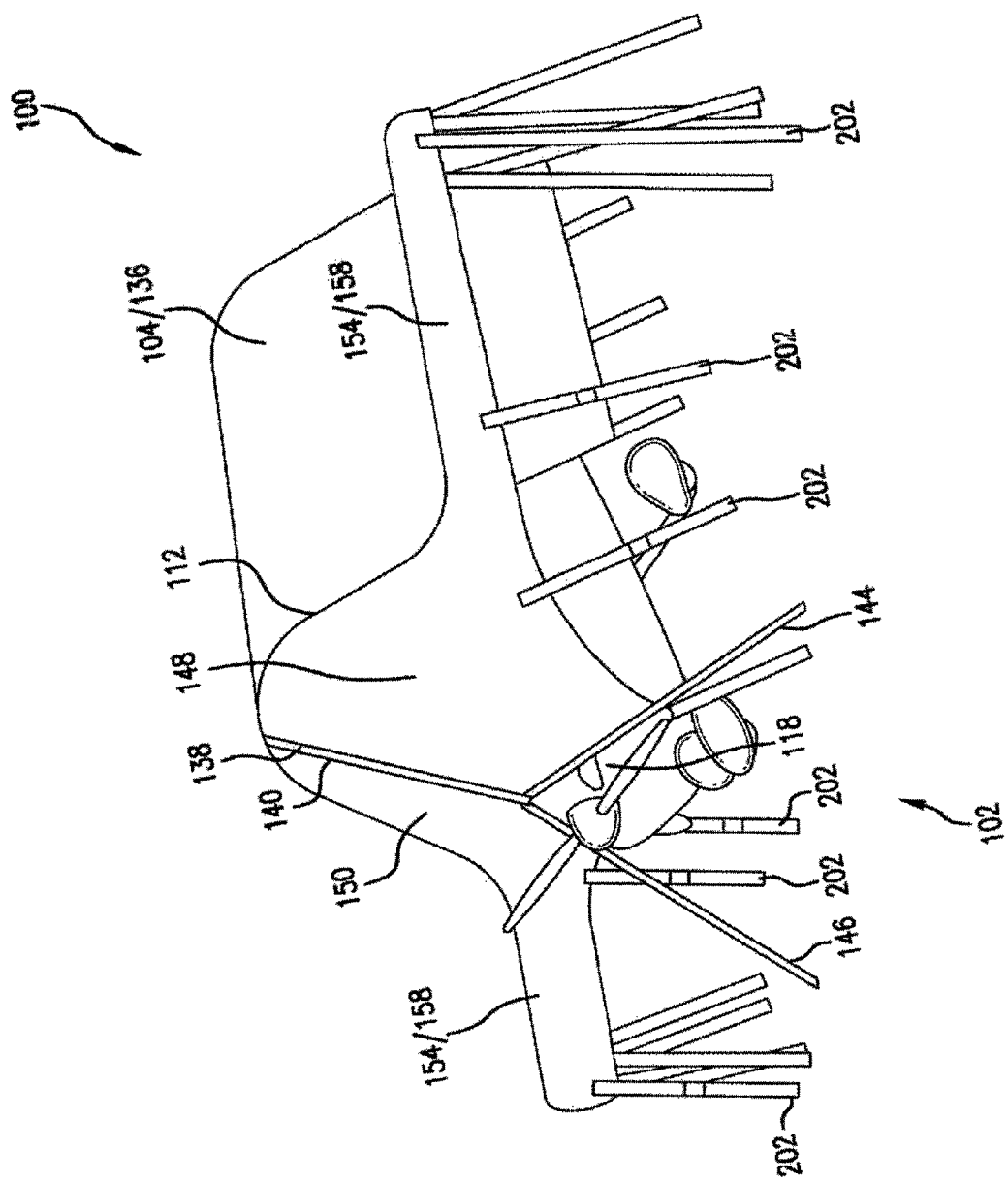
FIG. 13 is a perspective front view of the aircraft shelter of FIG. 12, in a closed position.

While the embodiment of FIG. 1 and FIG. 2 demonstrates an aircraft shelter 100 for sheltering a low-wing aircraft 102, FIG. 12 and FIG. 13 show an alternate embodiment of an aircraft shelter 100 which is designed for the sheltering of a high-winged airplane as the aircraft 102, FIG. 12 showing that embodiment in an open position and FIG. 13 in a closed position.

Figure 14:
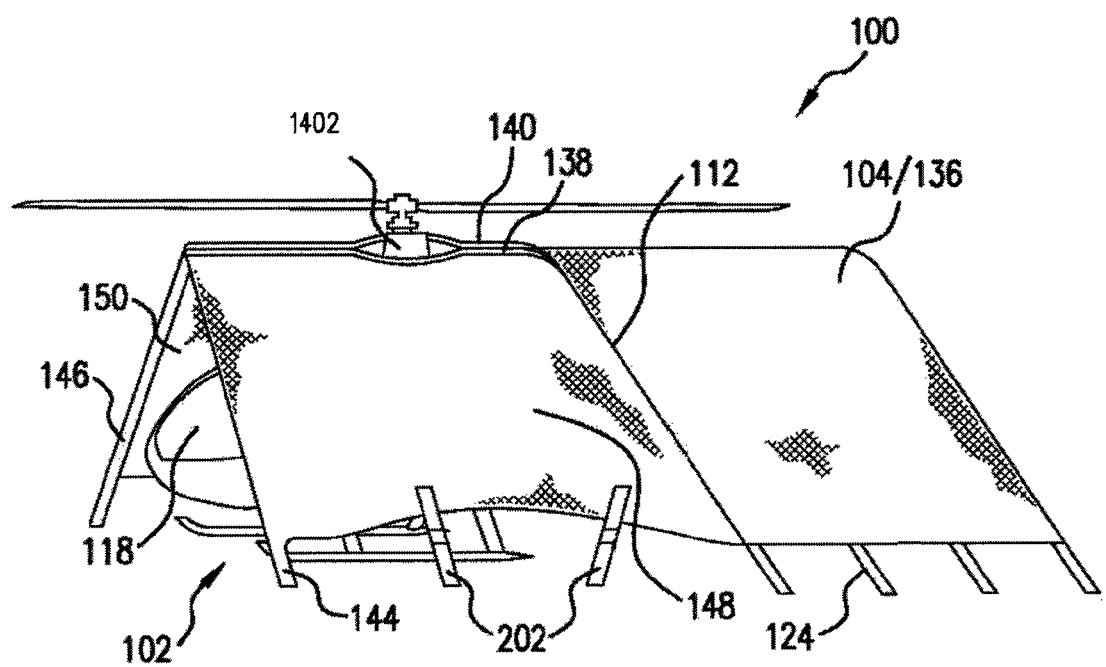
FIG. 14 is a perspective front view of another embodiment of an aircraft shelter in accordance with the present invention, wherein the aircraft is a helicopter, the aircraft shelter being shown in a closed position.

FIG. 14 shows another embodiment of the aircraft shelter 100 of the present invention, in a closed position, wherein the aircraft 102 is a helicopter. Here, the forward edge 112 of the rear shelter section 104, covering the rear aircraft section 106 such as, for example, the tail and stabilizer (not shown)—is placed behind rotor shaft 1402 of the aircraft 102 and in proximity thereto. The front shelter section 108 comprises left front support beam 138 and right front support beam 140 movable mounted to the forward edge 112 of the rear shelter section 104 as described above. Each of the left front support beam 138 and the right front support beam 140 is preferably rotatable moveable—mounted to a respective left front support post 144 and right front support post 146 extending downwardly to ground for supporting the same as described hereinabove for the aircraft shelter 100.

The left front support beam 138 and right front support beam 140 are placed above the cabin of the aircraft 102 with the left front support post 144 being oriented downward and to the left-hand side of the aircraft 102 and the right front support post 146 being oriented downward and to the right-hand side of the aircraft 102. Each of the left front support beam 138 and right front support beam 140 shown in this embodiment have a curved section adapted for surrounding a portion of the rotor shaft 1402 of the aircraft 102 in the closed position. Alternatively, the curved sections are omitted and the left front support beam 138 and right front support beam 140 are mounted to the forward edge 112 of the rear shelter section 104 spaced apart a distance greater equal to the diameter of the rotor shaft of the aircraft 102 and rigidly and removably connected to each other via a coupling element disposed therebetween.

It will be recognized that the specific materials used in constructing the various components of the system described herein, are not considered to be limiting to the scope of the invention. Those of skill in the art will readily recognize and be able to select materials and components that will accomplish the objectives of the invention without requiring any inventive skill.

It should also be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An aircraft shelter for sheltering an aircraft having a rear aircraft section and a front aircraft section, comprising:
   a rear shelter section defining a rearward shelter cavity to shelter the rear aircraft section, having a top segment defining the apex of the rearward shelter cavity and a forward edge which is positioned in proximity to a forwardmost portion of the rear aircraft section when the aircraft is sheltered therein, comprising:
      a rear section support frame; and
      a rear section cover extending thereover; and
   a front shelter section forward of the forward edge of the rear shelter section and defining a forward shelter cavity, said front shelter section being moveable between a closed position for sheltering all or at least a substantial portion of the front aircraft section and an open position for enabling entry and exit of the aircraft from the aircraft shelter and comprising:
      at least one front support beam movably mounted to the forward edge of the rear shelter section in proximity to the top thereof such that in the closed position the front support beam is positioned above the front aircraft section;
      at least one front support post connected to the front support beam and extending downwardly to the ground; and
      a flexible front section cover extending forward from the forward edge of the rear shelter section, being supported by the at least one front support beam and the at least one front support post in the closed position to shelter the front aircraft section.

2. The aircraft shelter of claim 1 wherein the rear section cover is made of a flexible fabric.

3. The aircraft shelter of claim 1 wherein the rear section cover comprises a rigid cover defining the rearward shelter cavity.

4. The aircraft shelter of claim 1 wherein the at least one front support beam comprises a left front support beam and a right front support beam, and the at least one front support post comprises a left front support post connected to the left front support beam and a right front support post connected to the right front support beam.

5. The aircraft shelter of claim 4 wherein each of the left front support beam and the right front support beam are rotatably moveable.

6. The aircraft shelter of claim 5 wherein each of the left front support beam and the right front support beam is rotatably movable in a substantially vertical direction and a substantially horizontal direction.

7. The aircraft shelter of claim 4 wherein in the closed position the left front support beam and the right front support beam are substantially rigidly connected to each other.

8. The aircraft shelter of claim 4 wherein in the closed position the left front support beam and the right front support beam are disposed in close proximity to each other.

9. The aircraft shelter of claim 4 wherein in the closed position when the aircraft is sheltered therein the left front support beam and the right front support beam are positioned above the aircraft and wherein the left front support post is oriented downward to the ground to the left-hand side of the aircraft and the right front support post is oriented downward to the ground to the right-hand side of the aircraft.

10. The aircraft shelter of claim 4 wherein at least one of the left front support beam and the right front support beam has a curved section adapted for surrounding a portion of the aircraft when the aircraft shelter is in the closed position.

11. The aircraft shelter of claim 4 wherein the front section cover is mounted to the left front support beam and the right front support beam.

12. The aircraft shelter of claim 11 wherein the front section cover is mounted to the left front support post and the right front support post.

13. The aircraft shelter of claim 1 wherein the aircraft is a fixed wing aircraft having a left wing and a right wing, and the forwardmost portion of the rear aircraft section comprises the trailing edge of the left wing and the right wing of the aircraft.

14. The aircraft shelter of claim 13 further comprising a left wing shelter section and a right wing shelter section laterally extending from the rear shelter section and the front shelter section thereof for sheltering the left wing and the right wing of the aircraft when the aircraft shelter is in the closed position.

15. The aircraft shelter of claim 14 wherein:
   the left wing shelter section comprises a flexible fabric left wing cover and a rearward left wing beam laterally extending substantially perpendicularly outwards from the forward edge of the rear shelter section, for supporting the left wing cover; and
   the right wing shelter section comprises a flexible fabric right wing cover and a rearward right wing beam laterally extending substantially perpendicular outwards from the forward edge of the rear shelter section, for supporting the right wing cover.

16. The aircraft shelter of claim 15 wherein the rearward left wing beam and the rearward right wing beam are positioned above the ground approximately equal or higher in height than the forwardmost portion of the rear aircraft section when the aircraft is sheltered therein.

17. The aircraft shelter of claim 15 wherein:
   the left wing shelter section further comprises a forward left wing beam for supporting the left wing cover in front of a leading edge of the left wing of the aircraft; and
   the right wing shelter section further comprises a forward right wing beam for supporting the right wing cover in front of a leading edge of the right wing of the aircraft.

18. The aircraft shelter of claim 17 wherein the forward left wing beam and the forward right wing beam are positioned above the left wing and the right wing of the aircraft and in proximity thereto when the aircraft is sheltered therein.

19. The aircraft shelter of claim 18 further comprising:
   a left cantilever beam mounted to the rear shelter section and extending forward therefrom to support an inner end of the forward left wing beam; and
   a right cantilever beam mounted to the rear shelter section and extending forward therefrom to support an inner end of the forward right wing beam.

20. The aircraft shelter of claim 19 further comprising:
   a left wing beam support structure for supporting an outer end of the forward left wing beam and the rearward left wing beam; and a right wing beam support structure for supporting an outer end of the forward right wing beam and the rearward right wing beam.

21. The aircraft shelter of claim 20 wherein:

the left wing beam support structure comprises a left front support post extending downwardly to the ground, and rotatably moveable mounted to an inner end of the forward left wing beam; and the right wing beam support structure comprises a right front support post extending downwardly to the ground and rotatably moveable mounted to an inner end of the forward right wing beam.

22. The aircraft shelter of claim 20 wherein:

the left wing beam support structure and the right wing beam support structure are telescopically adjustable; and the left cantilever beam and the right cantilever beam are each adapted for being mounted to the rear shelter section at different distances above the ground.

23. The aircraft shelter of claim 1 wherein the aircraft is a helicopter and the forwardmost portion of the rear aircraft section is a rear of the rotor shaft of the helicopter.

24. The aircraft shelter of claim 1 wherein the front shelter section can be locked in the closed position.

* * * * *